May 12, 1931.  E. J. RICHARDSON  1,805,226
REVERSE MOTION CHECK
Filed Aug. 5, 1929   2 Sheets-Sheet 1
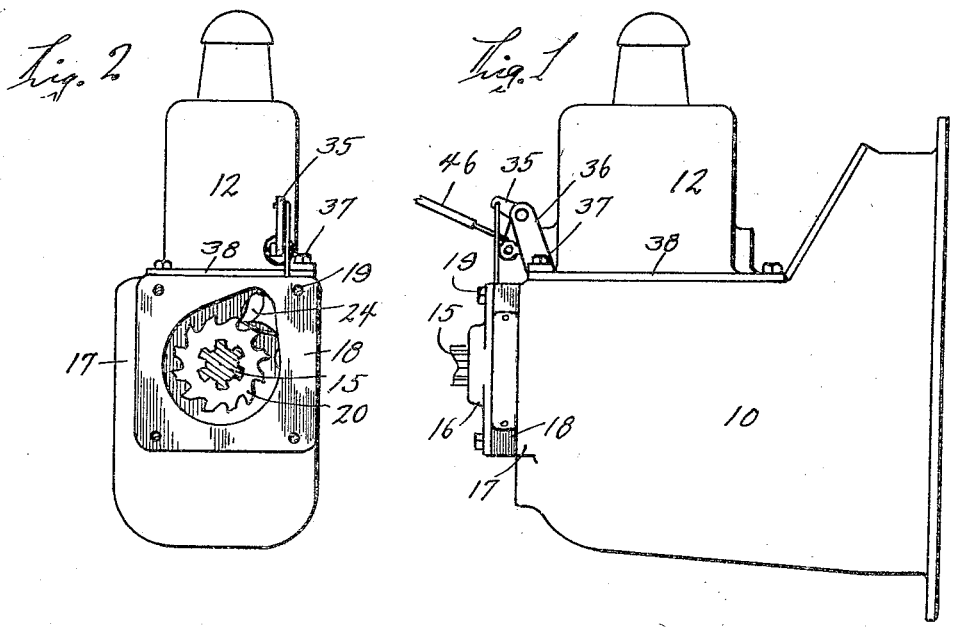
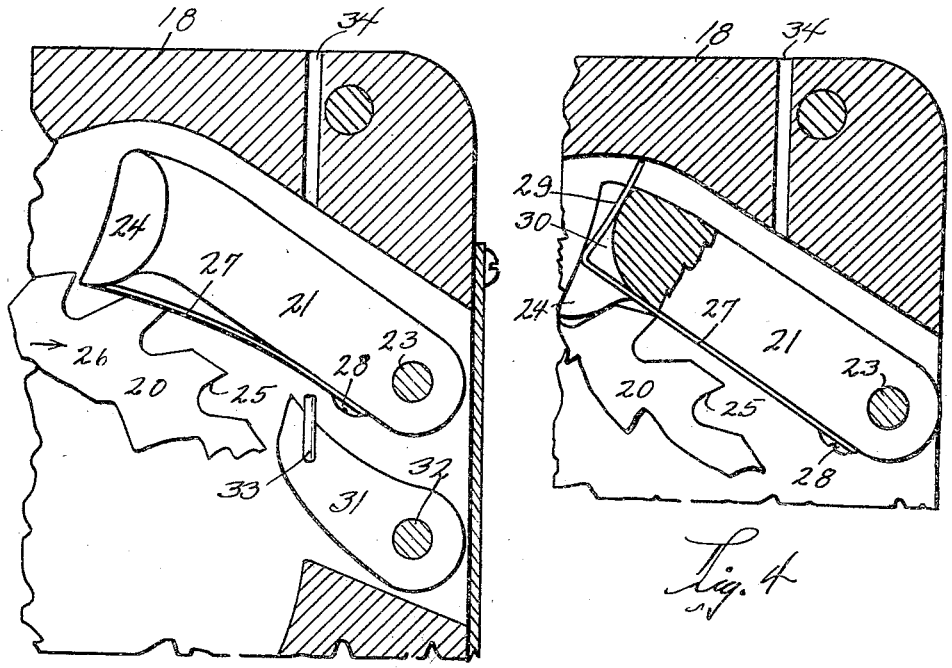
Fig. 2  Fig. 1  Fig. 3  Fig. 4
Inventor
Edgar J. Richardson
By Lynn H. Latta
Attorney Patented May 12, 1931

1,805,226

UNITED STATES PATENT OFFICE

EDGAR J. RICHARDSON, OF SHERIDAN, WYOMING

REVERSE MOTION CHECK

Application filed August 5, 1929. Serial No. 383,663.

My invention relates to reverse motion check devices for automobiles, and has for its object to provide a check of this character which is of simple, durable, and inexpensive construction.

In carrying out the above very general object, it has been my aim to embody the check apparatus in a device of the type employing a ratchet wheel and checking dog, the ratchet wheel to be attached to the transmission shaft of the vehicle. One of the problems encountered in dealing with this type of mechanism has been that of eliminating noise. It will be understood that in the automatically controlled check, the checking dog will ride over the ratchet wheel at all times except when the transmission has been shifted to reverse gear. This riding over the teeth of the ratchet wheel will ordinarily cause a humming sound arising from the rapid contacts of the dog with the teeth. An object of my invention is to provide a structure which will operate without this humming sound being produced.

Another object of my invention is to improve upon the mechanism for connecting the checking dog to the transmission in order to obtain the automatic control. It is my purpose in this connection to provide a device which will be attachable to the ordinary transmission with a minimum of alteration of the transmission.

A further object is to provide a check device substantially enclosed in a relatively thin casing which may be readily attached to the transmission housing of the vehicle by inserting it between the rear end of the same and the cap which ordinarily seals said rear end.

A still further object is to provide a device capable of being controlled manually from the instrument board of the vehicle as well as by the action of the shifting mechanism.

Figure 5:
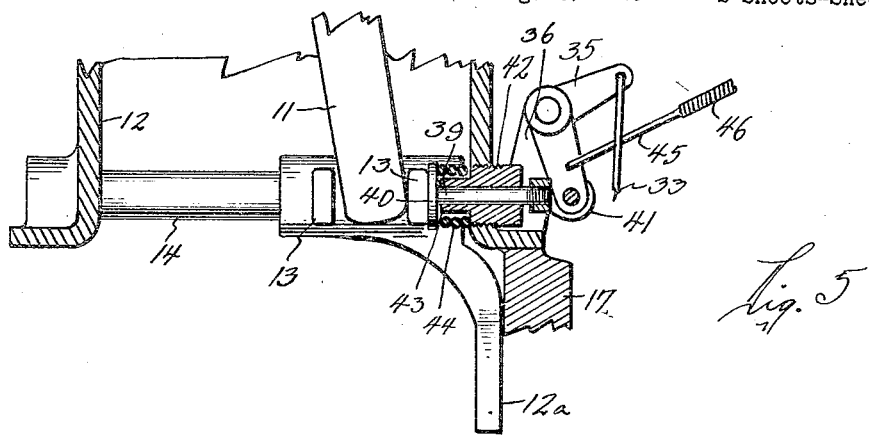
Figure 6:
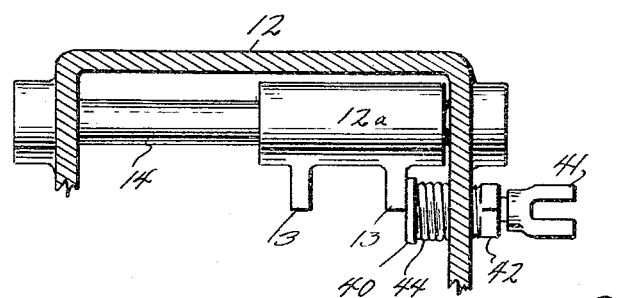
Figure 7:
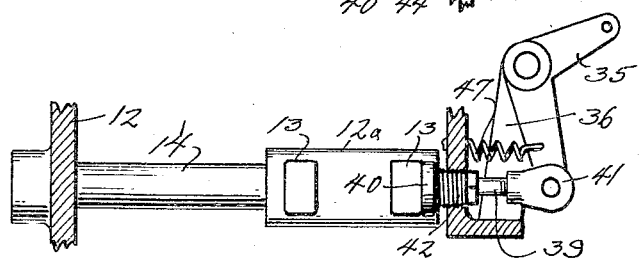
Figure 8:
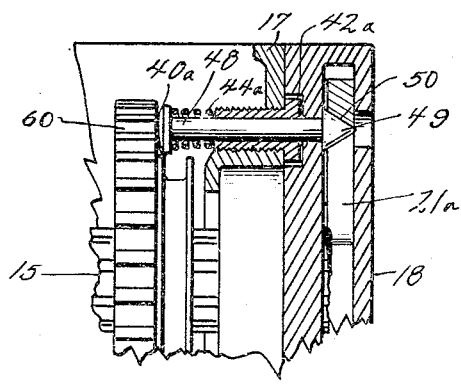

With these and other objects in view, my invention consists in the construction, combination, and arrangement of the various parts of my invention, whereby the various objects are attained, as hereinafter more fully set forth, pointed out in my drawings, and illustrated in the accompanying drawings, in which:

Fig. 1 is a side elevation of a vehicle transmission embodying my invention,

Fig. 2 is a sectional view taken transversely through the transmission shaft of the same, Fig. 3 is a detail sectional view through the check device casing, illustrating the silencer mechanism, Fig. 4 is a similar view, the parts being shown in relatively different positions, Fig. 5 is a detail sectional view illustrating the means for transmitting movement from the shifting gear to the checking dog, Fig. 6 is a horizontal sectional view of the same, Fig. 7 is a view similar to Fig. 5, of a modified form of the means for transmitting control, and Fig. 8 is a similar sectional view illustrating a further modification of the means for transmitting control.

I have used the reference character 10 to indicate generally the housing of an ordinary transmission such as is used on automotive vehicles. The shifting mechanism includes a shifting lever 11, illustrated in Fig. 5, a shifting lever casing 12, a shifting fork 12a, having lugs 13 between which the lever 11 is engaged, and a shaft 14, on which the fork 12a slides.

The transmission shaft 15 extends through the rear end of the transmission housing 10, and the opening through which it extends is ordinarily closed by a cap 16, bolted to the end wall 17 of the housing 10 by means of cap screws.

My check device is formed as an attachable unit, including a relatively thin, plate-shaped casing 18, provided with openings to receive screws 19, extended through the casing into the threaded openings from which have been removed the cap screws originally used to hold the cap 16 in place.

The cap 16 is replaced over the casing 18, as shown, and serves to close the rear side of the casing.

I provide a ratchet wheel 20, which has a central opening shaped to fit the shaft 15, whether the latter be splined or squared.

The checking dog 21 is positioned in a cavity 22 in the casing 18, and is pivoted upon pin 23, positioned so that the checking dog will extend over the ratchet wheel and tend to engage the same by gravitation toward the same. The head 24 of the pawl has a forward face which is substantially perpendicular to the longitudinal axis of the pawl, and the coacting faces 25 of the ratchet wheel teeth are slanted so that the head of the pawl will creep into the notches of the wheel under pressure of the teeth in the direction indicated by the arrow 26.

The silencer device comprises a highly resilient spring 27, secured at 28 to the pawl 21. The other end of the spring 27 is free, and is hooked upwardly as at 29 so as to provide a rounded corner against which the ratchet teeth may ride without causing an excessive amount of vibration of the pawl. The pawl is slotted as at 30, (Fig. 4), so that the spring may recede into the head 24 when the ratchet wheel moves reversely in the direction of the arrow 26.

The normal position of the spring is shown in Fig. 3. It will be noted that the head 24 projects substantially below the arm of the pawl, so that it may enter the notches of the ratchet wheel, and that the spring normally allows the entering edge of the head 24 to just slightly extend below it. During rotation of the ratchet wheel in normal forward direction, the impact of each tooth of the wheel against the spring will give just enough elevating push to the pawl to cause it to ride smoothly above the tooth as the latter passes under the head 24.

However, when the direction of rotation of the ratchet wheel is reversed, the edge of the head 24 will catch the edge of one of the ratchet teeth, and the spring will be easily pushed upwardly out of the way as the force exerted against the ratchet wheel causes the pawl to slide into one of the notches of the wheel. The position is shown in Fig. 4.

In the form of my invention shown in Figs. 1–5, inclusive, the control of the checking pawl is effected by an idle dog 31, pivoted at 32 to the casing 18, just below the checking pawl 21. A rod 33 is pivoted to the idle dog 31, and passes upwardly through a notch 34 in the casing, to a bell crank lever 35, fulcrumed upon a bracket 36. The bracket 36 is secured to the shifting lever casing 12 by means of a cap screw 37, threaded into an opening already present in the flange 38 of the casing 12.

The means for transmitting movement from the shifting mechanism to the bell crank lever comprises a push rod 39, provided with a head 40, adapted to be engaged by the lug 13 of the shifting fork 12a. At its other end, the push rod is provided with a clevis 41, in which is pivoted the bell crank lever 35. The clevis 41 is threaded on the push rod 39, and may be removed for assembling purposes.

The push rod is journalled in a sleeve 42, threaded into the wall of the casing 12, and provided with a reduced collar 43, which supports a spring 44, compressed between the head 40 and the shoulder of the sleeve. The function of the spring 44 is to move the push rod reversely to the movement given to it by the shifting fork 12a.

The sleeve 42 may be attached by simply threading a suitably positioned opening into the wall of the casing 12.

The shifting fork 12a, when moved so as to engage the push rod 39, will simultaneously shift the transmission into reverse gear and lift the idle dog 31 to a position where it engages the checking pawl 21, lifting the latter away from engagement with the ratchet wheel and allowing the vehicle to be backed.

When the shifting fork is returned to a neutral position, or therebeyond, the idle dog will be allowed to drop to a position where it will not interfere with the normal engagement of the ratchet wheel by the checking pawl, and thus the device will be ordinarily operative when the vehicle is in neutral, or in any of the forward gears.

This condition may be varied by the use of the hand control, which comprises a flexible wire or cord 45, extending to the instrument board through a flexible tube 46.

The use of the idle dog construction in combination with the bell-crank lever, arranged as shown, makes it possible to include the hand control, attaching the wire 45 to the lower arm of the bell-crank lever and extending it in almost a straight line to the dash. The hand control does not interfere in any way with the automatic control, owing to the disconnected relation of the push rod and shifting fork.

The modified form shown in Fig. 7 is similar in all respects to that of Figs. 1–5, with the exception that a pull spring 47 is substituted for the push spring of the latter.

The modified form shown in Fig. 8 makes it possible to do away with the bell-crank lever (and also the idle dog, if the latter is desired).

A push rod 48 is employed in this form of the invention, engaging the reverse gear just below the teeth thereof. The outer end of the push rod 48 is provided with an inclined head 49, which is conical so that no matter how the rod may rotate, the head will at all times present an inclined surface to lift against the cam face 50 of the checking pawl 21a.

A coil spring 44a is compressed between the head 40a of the push rod and the threaded sleeve 42a, in which the push rod is journalled for sliding movement.

It is believed to be obvious how the longitudinal movement of the push rod will raise the checking pawl out of engagement with the ratchet wheel.

The advantage of employing the reverse gear as a direct instrumentality for giving controlling movement to the device lies in the possibility of thereby obtaining a direct connection to the checking dog. The elimination of a number of parts is obviously an advantage of considerable consequence.

Some changes may be made in the construction and arrangement of the various parts of my invention without departing from the true spirit thereof, and it is my intention to cover by my claims, any modified forms of structure that may be reasonably included within their scope.

I claim as my invention:

1. In a reverse motion check, in combination with a vehicle transmission housing and a transmission shaft journalled therein, a ratchet wheel secured to the shaft, a pawl pivoted relative to the housing in position to engage the ratchet to check reverse movement of the shaft, and a silencing spring comprising a spring element secured at one end to the pawl and extending substantially tangentially of the ratchet wheel between the pawl and the wheel, to engage the wheel and to support the weight of the pawl against the wheel, one end of the spring being free to recede away from the wheel to allow the pawl to engage the wheel.

2. In a reverse motion check, in combination with a vehicle transmission housing and a transmission shaft journalled therein, a ratchet wheel secured to the shaft, a pawl pivoted relative to the housing in position to engage the ratchet wheel to check reverse movement of the shaft, and a silencing spring comprising a spring element secured at one end to the pawl and extending substantially tangentially of the wheel and longitudinally of the pawl between the pawl and the wheel, one end of the spring being free to recede toward the pawl, and the pawl being recessed to receive said free end of the spring.

3. In a reverse motion check, in combination with a vehicle transmission housing and a transmission shaft journalled therein, a ratchet wheel secured to the shaft, a pawl pivoted relative to the housing in position to engage the ratchet wheel to check reverse motion of the shaft, and a silencing spring comprising a spring element secured to the pawl near the pivot thereof and extending longitudinally thereof between the pawl and the wheel, the head of the pawl being recessed and the other end of the spring being free to recede into said recess when the pawl engages the wheel.

4. In a reverse motion check, in combination with a vehicle transmission housing and a transmission shaft journalled therein, a ratchet wheel secured to the shaft externally of the housing, a pawl pivoted relative to the housing in a position to engage the ratchet wheel, and means for transmitting movement of the reverse gear shifting mechanism to the pawl to lift the same, comprising a bell crank lever fulcrumed relative to the housing and provided with an arm projecting downwardly and another arm projecting away from the housing, a push rod connected to the downwardly projecting arm and extending through the wall of the housing to be engaged by a portion of the shifting mechanism, a link extending downwardly from the outwardly extending arm to transmit lifting movement to the pawl, and a hand control element secured to the downwardly extending arm.

5. In a reverse motion check, in combination with a vehicle transmission housing and a transmission shaft journalled therein, a ratchet wheel secured to the shaft externally of the housing, a pawl pivoted relative to the housing in position to engage the wheel, and means for transmitting movement of the shifting mechanism of the vehicle to the pawl, comprising a bell crank lever fulcrumed relative to the housing and provided with an arm projecting downwardly and another arm projecting away from the housing, a push rod connected to the downwardly extending arm and extended through the wall of the housing to engage the shifting mechanism, and a link extending downwardly from the outwardly extending arm to transmit lifting movement to the pawl.

6. In a reverse motion check, in combination with a vehicle transmission housing and a transmission shaft journalled therein, a ratchet wheel secured to the shaft externally of the housing, a pawl pivoted relative to the housing in a position to engage the ratchet wheel, and means for transmitting movement from the shifting mechanism of the transmission to the pawl to lift the same, including an externally threaded bushing threaded through the wall of the transmission, a push rod journalled in the bushing and provided with a head to engage a portion of the transmission, a coil spring encircling the rod and engaging the head to urge it against said portion.

7. In a reverse motion check device, in combination with a vehicle transmission including a transmission housing, a reverse gear slidably mounted therein, and a transmission shaft journalled therein, a ratchet wheel secured to the shaft externally of the housing, a pawl pivoted relative to the housing, in position to engage the wheel to check reverse motion of the shaft, and means for transmitting movement of the reverse gear to the pawl, comprising a push rod slidably extended through the wall of the housing in a position to be engaged by the side of the reverse gear, a spring to urge the rod against the gear, and a conical head on the rod, positioned to engage the under side of the pawl, and adapted to transmit longitudinal movement of the rod into lifting movement in the pawl.

8. In a reverse motion check, in combination with a vehicle transmission including a transmission housing, a reverse gear slidably mounted therein, and a transmission shaft journalled therein, a ratchet wheel secured to the shaft externally of the housing, a pawl pivoted relative to the housing in position to engage the ratchet wheel to check reverse movement of the shaft, and means for transmitting movement of the reverse gear to the pawl, including a push rod slidably extended through the wall of the housing in a position to engage the side of the gear, a spring to urge the rod against the gear, and a head on the rod providing an inclined cam face engaging the lower side of the pawl and adapted to transform longitudinal movement of the rod into lifting movement in the pawl.

9. In a reverse motion check, in combination with a vehicle transmission including a transmission housing, a reverse gear slidably mounted therein, and a transmission shaft journalled therein, a ratchet wheel secured to the shaft externally of the housing, a pawl pivoted relative to the housing in position to engage the wheel to check reverse movement of the shaft, a bell-crank lever fulcrumed relative to the housing above said pawl, and provided with a downwardly projecting arm and an outwardly projecting arm, a link connected to the outwardly extended arm and projecting downwardly to transmit lifting movement to the pawl, an externally threaded sleeve threaded through the wall of the housing in line with the downwardly projecting arm, a push rod slidingly mounted in the sleeve and connected to said downwardly projecting arm, the inner end of the push rod being provided with a head to engage an element of the transmission which moves during shifting into reverse gear, and a spring engaging said head and encircling the rod, to urge the head against said element.

Signed at Sioux City, in the county of Woodbury and State of Iowa, this 20th day of July, 1929.

EDGAR J. RICHARDSON.